(12) United States Patent
Storto et al.

(10) Patent No.: US 6,918,625 B2
(45) Date of Patent: Jul. 19, 2005

(54) CLOSE-OUT PANEL FOR STOWED SEATS

(75) Inventors: Anthony Storto, Rochester, MI (US);
Fred Castator, Farmington Hills, MI (US); Donald Olesko, Highland, MI (US); Mark E Gratowski, Shelby Township, MI (US); Glenn F Syrowik, Ortonville, MI (US); Lee Shilling, Lapeer, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 10/745,133

(22) Filed: Dec. 22, 2003

(65) Prior Publication Data
US 2005/0134076 A1 Jun. 23, 2005

(51) Int. Cl.[7] .................................... B60N 2/10
(52) U.S. Cl. ..................... 296/65.09; 296/66
(58) Field of Search ............... 296/191, 37.14, 296/66, 65.09, 69

(56) References Cited

U.S. PATENT DOCUMENTS

| | | | |
|---|---|---|---|
| 4,958,877 A | 9/1990 | Lezotte et al. | |
| 5,269,581 A | 12/1993 | Odagaki et al. | |
| 5,362,131 A | 11/1994 | Susko et al. | |
| 5,570,931 A | 11/1996 | Kargilis et al. | |
| 5,664,822 A | 9/1997 | Rosenfield | |
| 5,991,975 A | 11/1999 | Baer | |
| 6,089,641 A | 7/2000 | Mattarella et al. | |
| 6,174,017 B1 | 1/2001 | Salani et al. | |
| 6,416,107 B1 * | 7/2002 | Kanaguchi et al. | 296/65.09 |
| 6,705,657 B2 * | 3/2004 | Kutomi et al. | 296/65.09 |
| 6,793,265 B2 * | 9/2004 | Kamida et al. | 296/65.09 |
| 2004/0100117 A1 * | 5/2004 | Rhodes et al. | 296/66 |

* cited by examiner

Primary Examiner—Jason Morrow
(74) Attorney, Agent, or Firm—Ralph E. Smith

(57) ABSTRACT

A close-out panel for a stowable vehicle seat assembly having pivotable connections to a vehicle floor, the close-out panel having: a first edged attached to the stowable vehicle seat assembly, a second edge, parallel to the first edge, and a living hinge positioned between and parallel to the first edge and the second edge. The living hinge enables the close-out panel to fold when the stowable vehicle seat is deployed and to open into a flat panel flush with the vehicle's floor that conceals the pivotable connections when the vehicle seat is pivoted to a stowed position.

13 Claims, 6 Drawing Sheets

CLOSE-OUT PANEL FOR STOWED SEATS

FIELD OF THE INVENTION

This invention relates to a moveable panel that is configured to conceal the workings of a stowed seat. More specifically, the invention describes a specialized close out panel attached to a stowable seat and configured to cover the seat mounting brackets and the gap between the seat tub and floor pan.

BACKGROUND OF THE INVENTION

One of Chrysler's most significant contributions to automotive design is the mini-van. Prior to the mini-van, consumers had to choose between the cramped cargo space of a station wagon or a truck-like full size van. The minivan changed this by offering car like feel with van sized interior space.

In early minivan designs, it was necessary to completely remove the second and third rows of seats. While clever designs generally permitted this to be accomplished without tools and with relative ease; the bulkiness of a folded seat generally made this a two person job.

More contemporary mini-vans have eliminated the necessity of removing the seats with a variety of clever designs for seats that fold, or "fold and tumble." A number of these seats are described in U.S. Pat. No. 5,570,931 (folding rear seat); U.S. Pat. No. 6,089,641 (tiered folding seats); and U.S. Pat. No. 6,174,017 (dumping and articulating seat).

While rear seats that fold and stow represent an improvement over removable seats, a folded seat still takes up interior space and yields a less than uniform cargo surface. One solution to this problem is providing "tubs" in the vehicle floor into which the seats "fold and stow." When stowed, a portion of the seat back or bottom is positioned flush with the portion of the vehicle floor surrounding the tub such as shown in U.S. Pat. No. 5,269,581 (storage structure for a collapsible seat).

Regardless of the precise mechanism and configuration for folding seats into the vehicle floor, the overall goal is to provide a cargo area that is free of protrusions and indentations. The usual design configuration involves configuring the seat bottom or the rear of the seat back rest so that it is flat and presented at the same level as the vehicle floor. However, a number of holes and indentations often remain around a portion of is the folded seat. These holes and indentations are undesirable because they tend to collect dirt and debris and affect a user's ability to easily slide and position objects on the vehicle floor.

One solution to this problem is to provide panels configured to cover the holes and indentations left when the seat is folded down. These panels are generally stowed somewhere under a seat and fitted into place by the vehicle user after folding down the seat. Such a solution has a number of drawbacks. If not attached somehow, such panels are easily lost or misplaced. Even if attached, such panels require an additional step to rearrange the vehicle seats in a cargo configuration. Because such panels usually have narrow lip, they must be made of a stiff, strong material, such as plywood, which adds to overall vehicle weight and expense.

SUMMARY OF THE INVENTION

One object of the present invention is a close-out panel that is deployed simultaneously when the vehicle seat is stowed.

Another object of the invention is a close-out panel that is stiff, light, and inexpensive.

These and other objects of the invention are satisfied by a close-out panel for a stowable vehicle seat assembly having pivotable connections to a vehicle floor, the close-out panel comprising: a first edged attached to the stowable vehicle seat assembly; a second edge, parallel to the first edge; a living hinge positioned between and parallel to the first edge and the second edge to permit the close-out panel to fold when the stowable vehicle seat is deployed and to open into a flat panel flush with the vehicle's floor that conceals the pivotable connections when the vehicle seat is pivoted to a stowed position.

DETAILED DESCRIPTION

Figure 1:
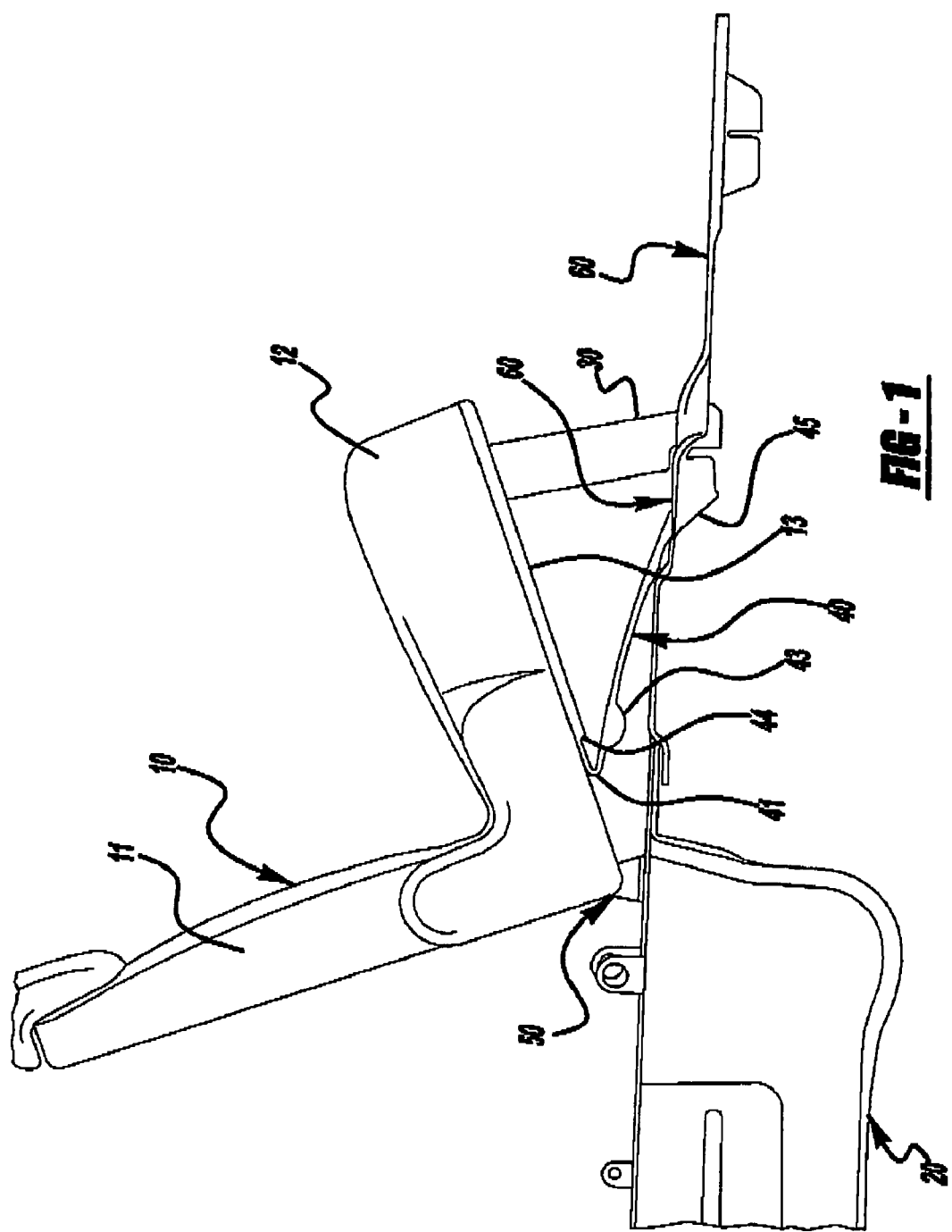
FIG. 1 is a side view of a deployed seat illustrating the positioning of the close-out panel according to the invention.

The present invention relates to a close-out panel for a stowable vehicle seat assembly where the seat is pivotably connected to the seat cushion. This close-out panel can be fabricated from any material that is stiff, light weight, and inexpensive. Preferably, plastic or reinforced plastic material is used to fabricate the close-out panel. Honeycombing, ridging, etc., may be used as necessary to increase the panel's stiffness without significantly affecting its overall weight.

Many vehicles are currently being manufactured that have stowable seating. That is, seats that are designed to be folded and stowed inside the vehicle to create a cargo area having a flat floor. A popular design involves providing detachable front connections between the seat and the vehicle floor and pivoting/sliding rear connections. A tub or other recessed area is provided in the floor behind the seat. To stow the seat, the back portion is folded flat against the seat cushion, the front seat connections are disconnected, and the folded seat is "tumbled" or pivoted about the rear connections into the tub. This leaves a gap between the stowed seat and tub and exposes the seat mounting brackets.

A close-out panel according to the invention is a flat panel in the shape of a regular polygon. At least two opposite edges of this panel are parallel to each other. The first of one of these parallel edges is attached to the bottom of the seat cushion of the seat. The second parallel edge is positioned against the vehicle floor. A living hinge is positioned between the first edge and the second edge to permit the close-out panel to fold over itself when the seat is deployed. As used herein, the term "living hinge" refers to a lateral connector that is preferably a plastic or other flexible material that is not resilient or elastic and is thin enough to permit folding or flexing. (Plastic living hinges are most frequently seen on plastic ice chests.) The use of a living hinge permits a close-out panel of the present invention to be fabricated easily and inexpensively using any of a variety of plastic fabrication methods (such as blow molding, injection molding, or a low pressure molding, etc.) in a single step as a single piece that includes fastening holes or devices, the living hinge, reinforcing ridges, etc. Preferably, the second edge is held positioned against the vehicle floor via a biasing device such as a plurality of tension cords when the seat is deployed.

To stow the seat, the seat back is folded down so the cushion side of the seat back contacts the cushioned side of the seat. The front legs of the seat are then disengaged and the folded seat is stowed by pivoting it about the rear pivot points of the seat so that the seat tumbles into the tub positioned behind it, thereby positioning the bottom of the folded seat so that it becomes a floor panel flush with the surrounding vehicle floor. As the seat is tumbled, the close out panel unfolds along the living hinge due to the action of the biasing device into a flat panel that extends from the seat and touches down to the vehicle floor. The unfolded close-out panel is flat and covers the gap between the seat and the inside wall of the tub as well as hinges, brackets, etc. located in the tub. Thus, close-out panels of the present invention combined with folding and tumbling the seats create a solid, uniformly flat cargo area.

In the Figures and Description, like numbers are used to refer to like components. Further, the term "front" or "forward" as used specifically refers to the forward part of the vehicle; and "rear" or "rearward" as used specifically refers to the rear part of the vehicle, FIG. 1 illustrates a seat 10 stowable in a tub 20 via rotation on the pivotable connections 50 with the attached close-out panel 40 of the present invention. When deployed as shown, the seat 10 is fastened securely to the vehicle floor 60 by front legs 30 and rear pivot points 50 positioned approximately at the corners of the seat 10. (The term "pivot point" as used herein is intended to include any connection necessary at the rear corner of the seat to accommodate the stowing of the seat. Thus, the pivot point could be a simple hinge, raised brackets acting as a rear seat legs, a bracket of any shape providing pivoting and sliding functions, or a powered bracket capable of pivoting, sliding, or both, designed to permit electrically powered remote stowing of the seat, or any a combination of these.)

A first edge 44 of the close-out panel is attached to the bottom 13 of the vehicle seat, and a second edge 45, parallel to the first edge, is held against the vehicle floor 60. A living hinge 41 is located between and parallel to the first edge 44 and the second edge 45 to permit the close-out panel 40 to fold when the stowable vehicle seat 10 is deployed as shown in FIG. 1.

Figure 3:
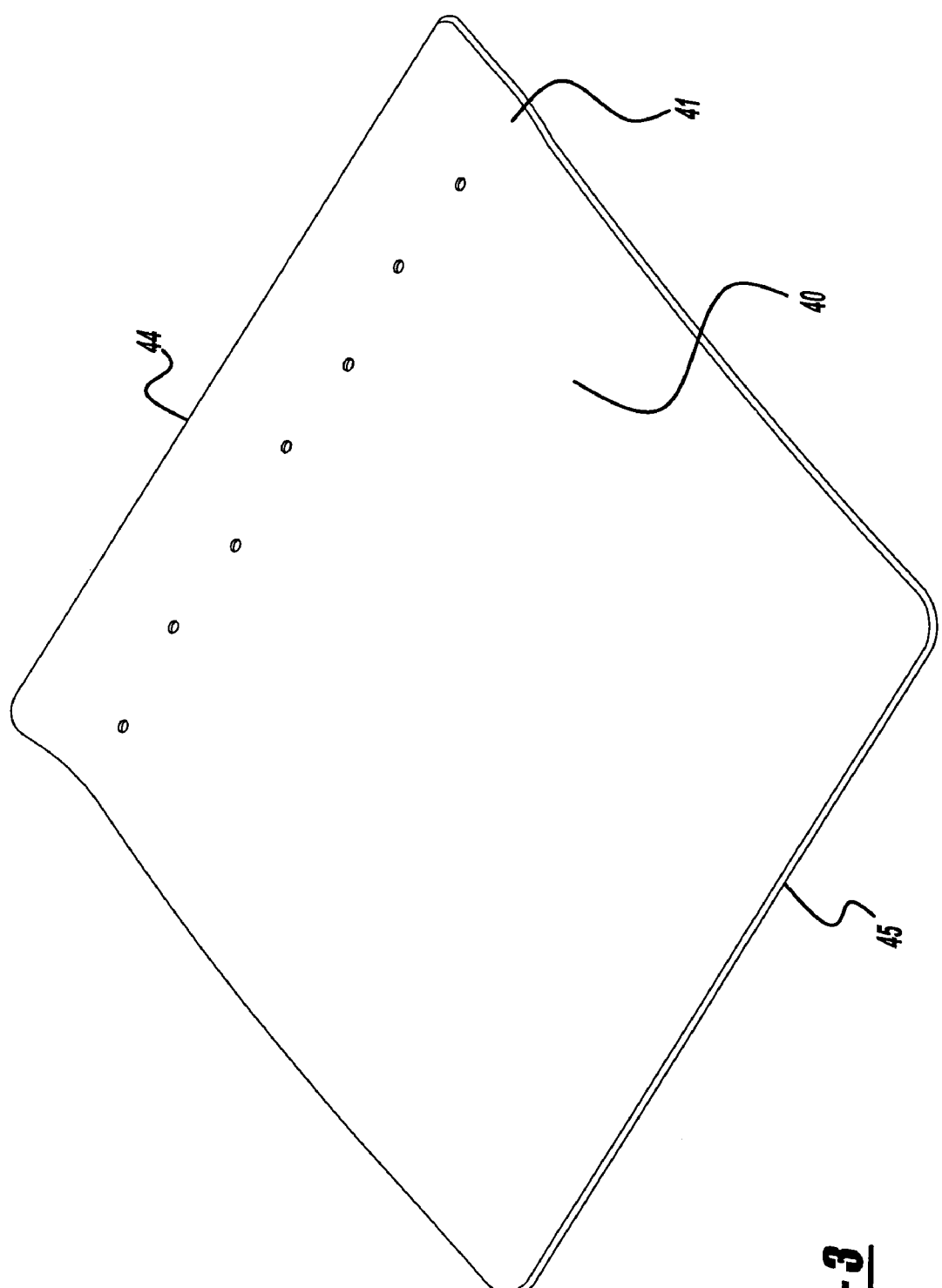
FIG. 3 is a perspective view of the top face of the close-out panel.

FIG. 3 illustrates a perspective view of the top face of close-out panel 40, including living hinge 41.

Figure 2:
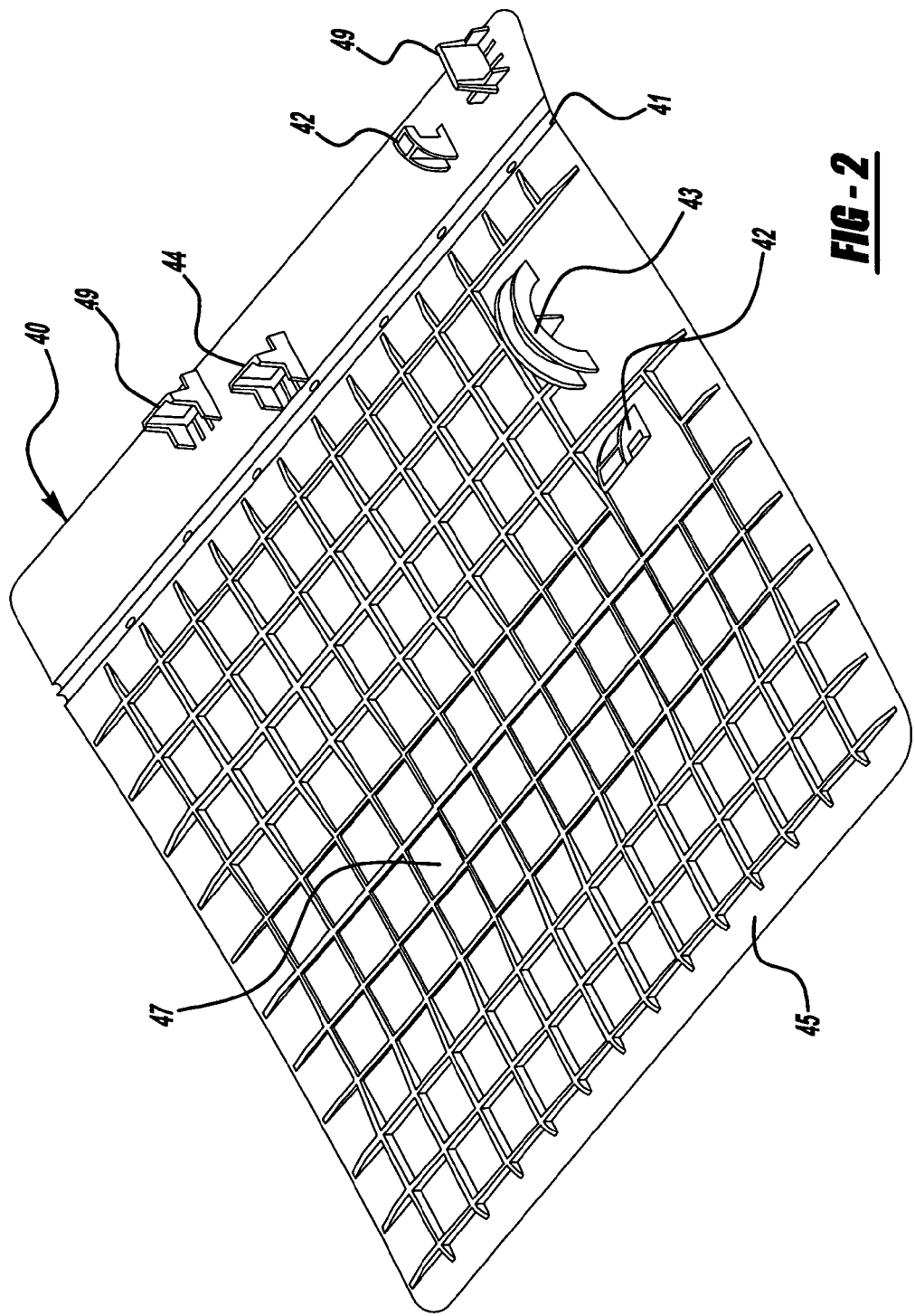
FIG. 2 is a perspective view of the bottom of a close-out panel according to the invention.

FIG. 2 illustrates the bottom of a closeout panel showing reinforcing ridges 47. While shown in a crosshatched pattern, these ridges 47 may be arranged in any suitable pattern. In addition, the ridges are shown having a variable thickness. This variation in thickness is provided to accommodate the various parts that are covered by the close-out panel 40 (such as the edge of the stowed, folded seat; various brackets; etc.). Thus, the covered part comes in direct contact with the close-out panel 40 to provide a region of support thereby providing a solid surface with a lightweight panel. Snap clips 49 may be positioned on the bottom of the close-out panel 40 to mate with corresponding bores (not shown) in the tub 20 or seat bottom 13 to permit the close-out panel 40 to be removeably secured over the folded seat (see, FIG. 5).

Figure 4:
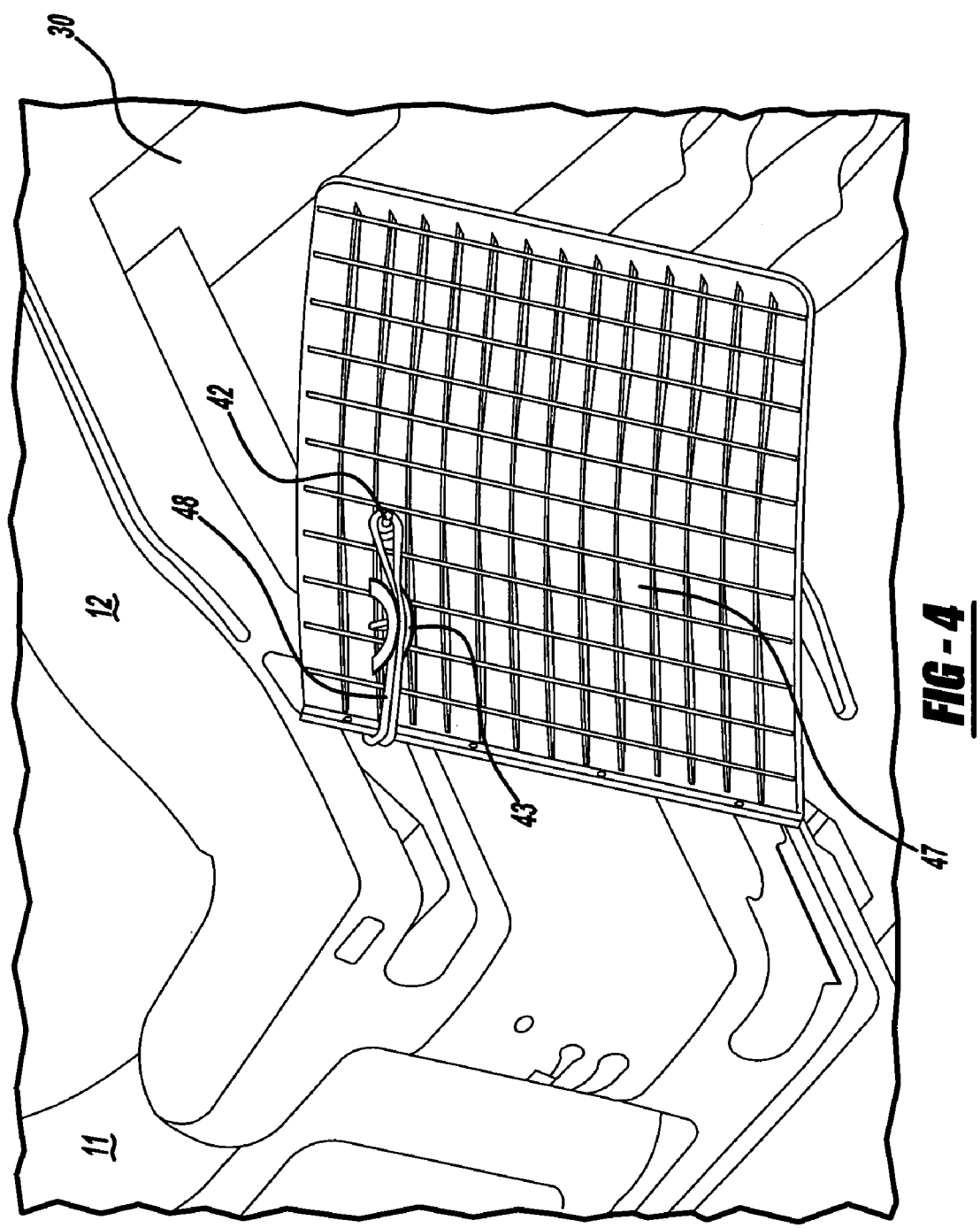
FIG. 4 is a perspective view of the bottom of a close-out panel according to the invention attached to the bottom of a deployed seat.
Figure 5:
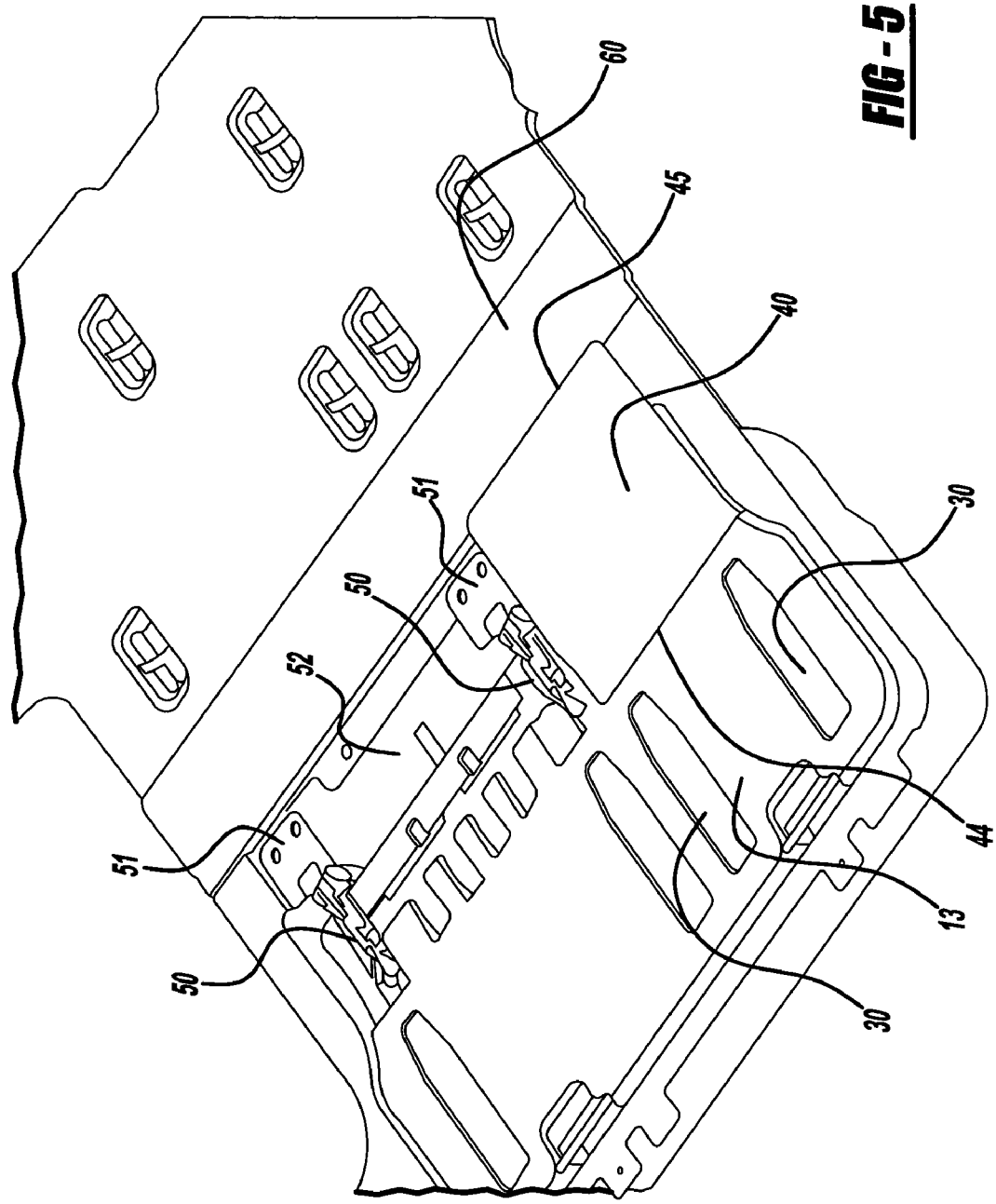
FIG. 5 is a perspective view of a vehicle floor showing folded seats and one close-out panel according to the invention.

Also shown in FIG. 2 are hooks 42 and a bridge point 43 for securing and positioning a biasing device 48 such as a loop of tension cord (or a spring or a section or loop of elastomeric material, etc.). The hooks 42 and the bridge 43 are positioned so that when the seat 10 is in the stowed position, the biasing device 48 helps to unfold the folded close-out panel 40 (as seen in FIG. 1 and FIG. 4) by urging the close-out panel to open and remain open and flat and hold the second edge 45 against the vehicle floor (as seen in FIG. 3 and FIG. 5). More than one biasing device may be used.

FIG. 5 illustrates a 60/40 rear seat folded into a tub. The close-out panel 40 for the 40% seat is shown. Visible for this panel are the second edge 45 urged against the vehicle floor 60 and the first edge 44, attached to the bottom of the seat 13. Also visible are the front legs 30 folded into their respective slots in the bottom of the seat 13. The close-out panel 40 is not shown for the 60% seat in order to show the pivot points 50, attachment points 51 (seat bracket) and the gap 52 that are covered when the close-out panel 40 is in position.

Figure 6:
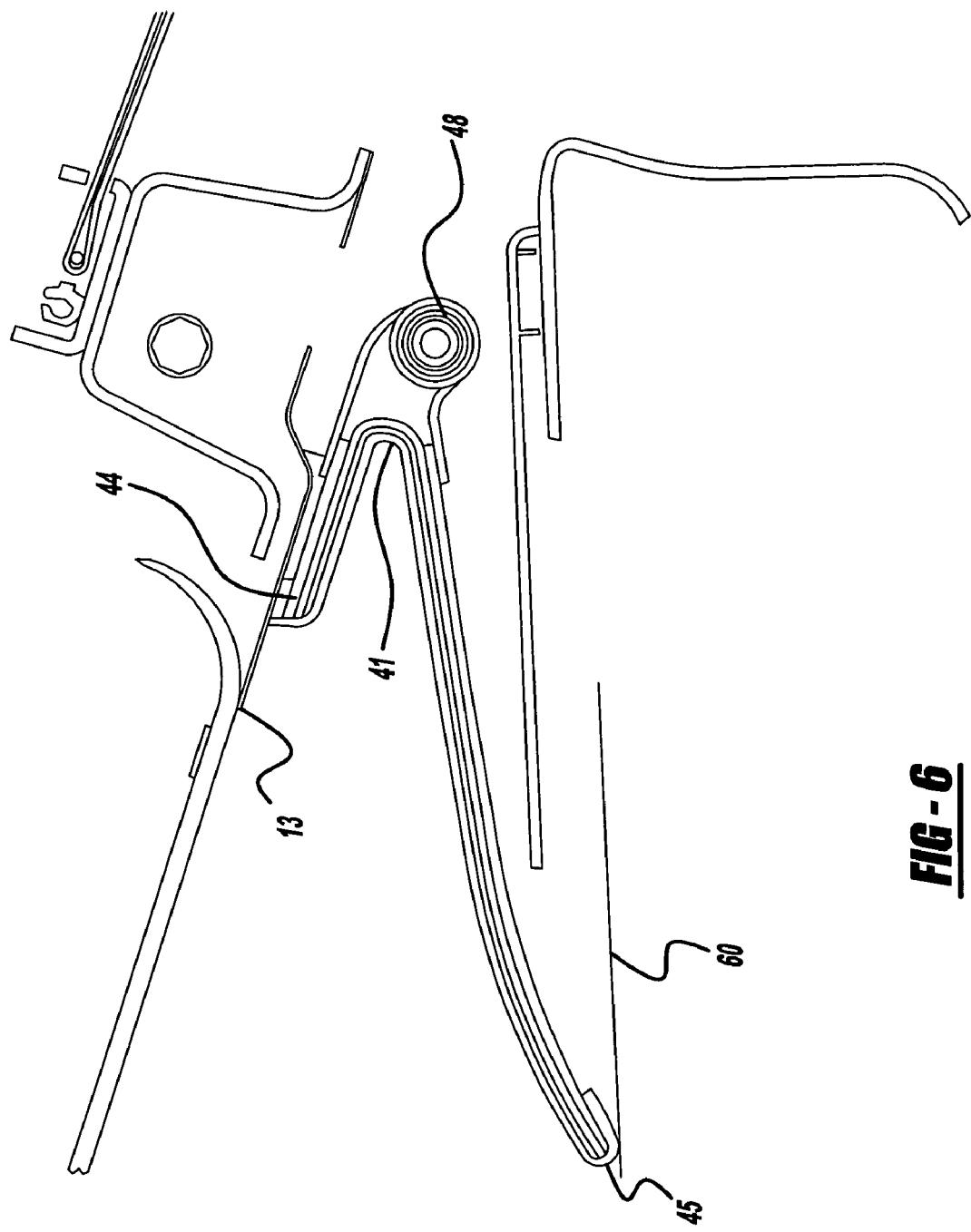
FIG. 6 is a side view illustrating an exemplary biasing device in accordance with the present invention.

FIG. 6 illustrates a spring biasing device 48. With this type of spring, a bridge point 43 is unnecessary. The tub is to the right of the Figure out of the frame. Note how the panel is flexed at the living hinge 41, the second edge 45 is urged against the vehicle floor 60, and the first edge 44 is attached to the bottom of the seat 13.

From the foregoing one skilled in the art will understand that the close-out panel 40 of the present invention can be fastened to a vehicle using adhesive or fasteners and that what is shown as the edges 44 and 45 may actually be regions of various thicknesses depending on the specific application. All such mounting methods and configurations are within the scope of the present invention.

It is to be understood that although the invention has been described with particular reference to specific embodiments thereof, the forms of the invention shown and described are to be taken as a non-limiting embodiment and various changes and modifications may be made to the invention without departing from its spirit and scope as defined by the claims.

What is claimed is:

1. A close-out panel for a stowable vehicle seat having pivotable connections to a vehicle floor, said close-out panel comprising:
    a first edge attached to said stowable vehicle seat;
    a second edge, parallel to said first edge;
    a living hinge positioned between and parallel to said first edge and said second edge to permit said close-out panel to fold when said stowable vehicle seat is deployed and to open into a flat panel flush with said vehicle's floor that conceals said pivotable connections when said vehicle seat is pivoted to a stowed position; and
    a biasing device fixed on either side of said living hinge to urge said second edge against said vehicle floor when said vehicle seat is deployed and flush with said vehicle's floor when said vehicle seat is stowed.

2. The close-out panel of claim 1, further comprising a bridge point positioned under said biasing device.

3. The close-out panel of claim 1, where said biasing device is a tension cord or a spring.

4. The close-out panel of claim 1, where said panel is formed from plastic material.

5. The close-out panel of claim 1, where said panel is formed from a carpet covered plastic material.

6. The close-out panel of claim 1, where said panel is formed from a reinforced plastic material.

7. A stowable vehicle seat assembly with a seat cushion having pivotable connections to a vehicle floor and forward facing legs, said seat assembly comprising:
   a close-out panel having a first edged attached to said seat cushion;
   a second edge, parallel to said first edge;
   a living hinge positioned between and parallel to said first edge and said second edge; and
   slots in said seat cushion for stowing said forward facing legs flat and flush with said vehicle's floor.

8. The stowable vehicle seat assembly of claim 7, further comprising: a biasing device fixed on either side of said living hinge to urge said second edge against said vehicle floor when said vehicle seat assembly is deployed and flush with said vehicle's floor when said vehicle seat assembly is stowed.

9. The stowable vehicle seat assembly of claim 7, further comprising a bridge point positioned under said biasing device.

10. The stowable seat assembly of claim 8, where said biasing device is a tension cord or a spring.

11. The stowable seat assembly of claim 7, where said panel is formed from plastic material.

12. The stowable seat assembly of claim 7, where said panel is formed from a carpet covered plastic material.

13. The stowable seat assembly of claim 7, where said panel is formed from a reinforced plastic material.

* * * * *